US012810408B2

(12) United States Patent
Kaul et al.

(10) Patent No.: US 12,810,408 B2
(45) Date of Patent: Nov. 24, 2026

(54) EVALUATING PRODUCTION BATCHES USING MACHINE-LEARNING

(71) Applicants: Merck Sharp & Dohme LLC, Rahway, NJ (US); MSD International GmbH, Lucerne (CH)

(72) Inventors: Nitin Kaul, Belle Mead, NJ (US); Guglielmo Iozzia, Swords (IE)

(73) Assignees: Merck Sharp & Dohme LLC, Rahway, NJ (US); MSD International GmbH, Lucerrne (CH)

( * ) Notice: Subject to any disclaimer, the term of this patent is extended or adjusted under 35 U.S.C. 154(b) by 279 days.

(21) Appl. No.: 18/638,678

(22) Filed: Apr. 18, 2024

(65) Prior Publication Data

US 2024/0354929 A1 Oct. 24, 2024

Related U.S. Application Data

(60) Provisional application No. 63/460,277, filed on Apr. 18, 2023.

(51) Int. Cl.

| | |
|---|---|
| ***G06K 9/00*** | (2022.01) |
| ***G06T 7/00*** | (2017.01) |
| ***G06V 10/774*** | (2022.01) |
| ***G06V 10/776*** | (2022.01) |
| ***G06V 20/70*** | (2022.01) |

(52) U.S. Cl.

CPC .......... *G06T 7/0004* (2013.01); *G06V 10/774* (2022.01); *G06V 10/776* (2022.01); *G06V 20/70* (2022.01); *G06T 2207/20081* (2013.01)

(58) Field of Classification Search

CPC ........ G06T 7/0004; G06T 2207/20081; G06V 10/774; G06V 10/776; G06V 20/70; G06V 10/82

See application file for complete search history.

(56) References Cited

U.S. PATENT DOCUMENTS

| | | | | |
|---|---|---|---|---|
| 2019/0360942 | A1* | 11/2019 | Kano | G01N 21/8851 |
| 2020/0126210 | A1* | 4/2020 | Li | G06F 16/532 |
| 2023/0022631 | A1* | 1/2023 | Rothmund | G06T 7/0004 |

* cited by examiner

*Primary Examiner* — Duy M Dang
(74) *Attorney, Agent, or Firm* — Fenwick & West LLP

(57) ABSTRACT

A method or a system for automated product inspection. The system receives multiple images of products captured from various perspectives. For each image, a machine-learning model is applied to the image to identify one or more defects in the products. Responsive to detecting a defect of a type, the system labels the image with the detected type of defect. The system further identifies duplicate defects based in part on data associated with context of the detected defects and data associated with context of cameras that captured images with the identified defects. The system groups duplicate defects together and initiates a corrective action based on the grouped defects.

20 Claims, 7 Drawing Sheets

300

400

| S. No | Row | Rule | Batch ID | Start Time | End Time | Total Inspected | Total Accepted | Total Rejected | Comments |
|---|---|---|---|---|---|---|---|---|---|
| | 1 | split_batch | 0000755371G2PO | 10/24/2017 22:23 | 10/25/2017 0:45 | 29832 | 28296 | 1536 | |
| | 2 | split_batch | 0000755371PO | 10/25/2017 1:08 | 10/25/2017 5:41 | 56270 | 53086 | 3184 | |
| | 3 | Split_batch_single_record | 0000755371R1 | 1 entry | 10/27/2017 19:20 | 0 | 0 | 0 | Ignore this batch |
| | 4 | split_batch | 0000755371G1PAR1 | 10/28/2017 2:38 | 10/28/2017 4:04 | 33664 | 31457 | 2207 | |
| | 5 | **Stage 1:Row 1 & 2** | 0000755371 | 10/24/2017 22:23 | 10/25/2017 5:41 | 86102 | 81382 | 4720 | |
| | 6 | **Stage 1:Row 5 & 3** | 0000755371 | 10/24/2017 22:23 | 10/27/2017 19:20 | 86102 | 81382 | 4720 | |
| | **7** | **Stage 1:Row 6 & 4** | **0000755371** | **10/24/2017 22:23** | **10/27/2017 4:04** | **119766** | **112839** | **6927** | |

FIG. 4

500

| | batch_key | actual_ end_time | actual_ start_time | batch_id | batch_type | building | end_total_ accepted | end_total_ inspected | end_total_ rejected |
|---|---|---|---|---|---|---|---|---|---|
| ☐ | 0000553391PA_1456912238.0_WestPoint_Lyo_829_AIM1 | 2016-03-02-11:28:27 | 2016-03-02 11:09:24 | 0000553391PA | child_batch | 829 | 2752.0 | 2996.0 | 244.0 |
| ☐ | 0000553391G1PA_1456918621.0_WestPoint_Lyo_829_AIM1 | 2016-03-02-12:24:12 | 2016-03-02 11:49:14 | 0000553391 G1PA | child_batch | 829 | 12804.0 | 13299.0 | 495.0 |
| ☐ | 0000553391PO_1456904613.0_WestPoint_Lyo_829_AIM1 | 2016-03-02-09:45:51 | 2016-03-02 11:49:14 | 0000553391PO | child_batch | 829 | 14682.0 | 15186.0 | 504.0 |
| ☐ | 000055339_11649910768.025098_WestPoint_Lyo_829_AIM1 | 2016-03-02-12:24:12 | 2016-03-02 08:45:36 | 0000553391 | parent_batch | 829 | 30238.0 | 31481.0 | 1243.0 |

FIG. 5

EVALUATING PRODUCTION BATCHES USING MACHINE-LEARNING

CROSS-REFERENCE TO RELATED APPLICATION

This application claims the benefit of U.S. Provisional Application No. 63/460,277, filed Apr. 18, 2023, which is incorporated by reference.

BACKGROUND

1. Technical Field

The subject matter described relates generally to product inspection during manufacturing and, in particular, to various techniques for using machine learning and other computational techniques to improve inspection efficiency.

2. Background Information

Products (e.g., pharmaceutical products) are produced on a production line. Products may be inspected at various stages of production, including raw materials, in-process products, and finished products. The sampling process must be statistically valid to ensure that the sample accurately represents the batch. Traditional approaches often rely on visual checks. This includes manually examining the physical appearance of the product, such as color, shape, and consistency. The integrity of the packaging and the accuracy of labeling information are also visually inspected to ensure that the packaging adequately protects the product and that the labeling provides correct usage, storage instructions, and warnings.

Manual visual inspections in the pharmaceutical industry, while crucial for ensuring the quality and safety of products, are inherently resource consuming. For example, manual inspections are labor intensive, as each item or batch needs to be inspected individually by trained personnel. This process can be slow, especially for products produced in large quantities, leading to bottlenecks in production timelines. Inspectors need to be trained to recognize defects and quality issues accurately. Maintaining a team of skilled inspectors requires ongoing education and re-certification to ensure they are up to date with the latest products and inspection standards. Further, human inspectors, despite their training, can exhibit variability in judgment. Factors such as fatigue, boredom, or subjective interpretation of criteria can lead to inconsistency or errors in inspection outcomes. Correcting these errors may require re-inspection, disposal of good products, or recall of defective products released into the market.

SUMMARY

Embodiments described herein include a method or a system configured to automate inspections of products. The system receives multiple images of products captured from various perspectives. For each image, a machine-learning model is applied to the image to identify one or more defects in the products. The machine-learning model is trained over labeled images that are labeled with various types of defects. Responsive to detecting a defect of a particular type, the system labels the image with the detected type of defect and stores the labeled image in a data store. In some embodiments, the system further identifies an area in the image that corresponds to the detected defect and annotates the image by generating a bounding box around the identified area. The system further identifies duplicate defects based in part on data associated with context of the detected defects and data associated with context of cameras that captured images containing the detected defects. The system groups duplicate defects together, and presents a unique defect contained in one or more images at a client device.

In some embodiments, the system retrains the machine-learning model based on the labeled images. The system may generate one or more synthetic images based on one or more labeled images identified as containing a particular type of defect and retrain the machine-learning model based on the one or more labeled images and the generated one or more synthetic images. The generation of one or more synthetic images may include applying a generative model on one or more original images to generate one or more synthetic images that contain a particular type of defect. A generative model may be selected based on the particular type of defect.

BRIEF DESCRIPTION OF THE DRAWINGS

FIGS. 3-5 are examples of graphical user interfaces (GUIs) of an analytics system in accordance with one or more embodiments.

DETAILED DESCRIPTION

Figure 1:
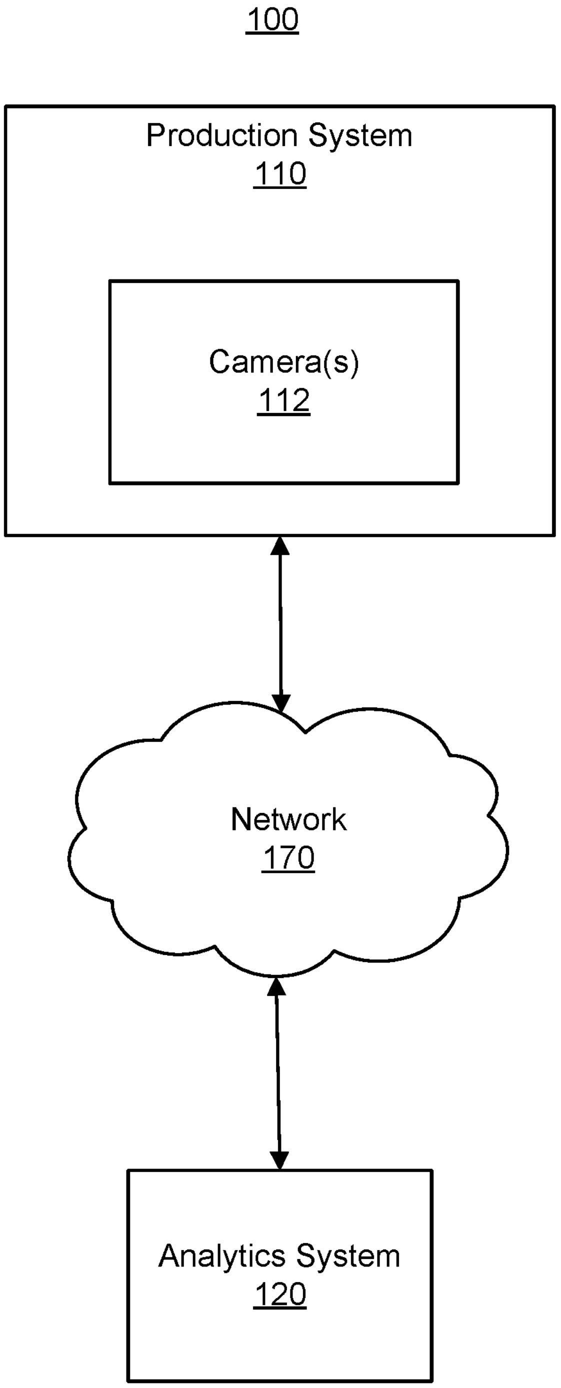
FIG. 1 is a block diagram of a production environment, according to one embodiment.

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Example System Environment

Products (e.g., pharmaceutical products) are produced on a production line. Products may be inspected at various stages of production, including raw materials, in-process products, and finished products. A sampling process should be statistically valid to ensure that the sample accurately represents the batch. Traditional approaches often rely on visual checks. This includes manually examining the physical appearance of the product, such as color, shape, and consistency to detect a variety of defects. The types of defects may include (but are not limited to) particle defects, fiber defects, and/or surface defects.

A production system may include multiple cameras that capture images of products at various stages of production to enable automated or semi-automated inspections of the products. The cameras can be positioned at various angles around a product being inspected. For example, a set of four cameras might be placed on each side of a product to identify particle defects. One or more machine learning models can be applied to the captured images to detect defects. In some embodiments, the one or more machine learning models are applied by an analytics system that receives the captured images from the production system via a network production system. Alternatively, or in addition, one or more machine learning models may be deployed on the cameras or elsewhere within the production system itself. In some embodiments, defined processing stages and techniques such as bounding boxes and Grad-CAM are used to aid in understanding model decisions and improve model explainability.

In some embodiments, the analytics system includes a deduplication module that detects images that include the same defect to avoid double counting of defects captured by different cameras. The analytics system may include an image query module that facilitates the exploration and classification of vast image datasets, enabling efficient image search and analysis for quality control and optimization.

In some scenarios, the machine learning models used by the analytics system may be difficult to train due to limited data and variability in manufacturing conditions. In such Scenarios, synthetic images may be generated to overcome data scarcity for certain defect types to enhance the training dataset. For example, various generative models may be used to generate the synthetic images. Experiment tracking and systematic recording can be used to reduce false negatives.

Another issue that can arise during manufacturing it that it is common to pause and restart a batch multiple times for various reasons, which leads to data gaps and inconsistencies that make defect analysis complex. The analytics system may include a batch reconciliation module that addresses these challenges by tracking and reconciling batch splits in real time. The batch reconciliation module maintains a record of main and sub-batches, using customizable rules to ensure data integrity. Additional details about the system are further described below with respect to FIGS. 1-5.

Example System Environment

FIG. 1 illustrates one embodiment of a production environment 100. In the embodiment shown, the production environment 100 includes a production system 110 and an analytics system 120, connected via a network 170. In other embodiments, the production environment 100 includes different or additional elements. In addition, the functions may be distributed among the elements in a different manner than described.

The production system 110 includes the machines, tools, robots, and/or controllers used to manufacture a product (e.g., a pharmaceutical product). The production system 110 also includes one or more cameras 112 that capture images of the product at one or more points during production. These cameras can be positioned at various angles around a product being inspected. For example, a set of four cameras might be placed on each side of a product to identify particle defects. In one embodiment, the cameras 112 capture images of the product once manufacturing is complete. Alternatively, the cameras 112 may capture images of the product at various stages of production, such as after completion of each of a defined set of steps in the production process.

The production system 110 provides the captured images to the analytics system 120 for analysis. The analytics system 120 includes one or more computers that analyze the images captured by the cameras 112 (and, in some embodiments, additional data) to detect manufacturing flaws in the product. The analytics system 120 may use one or more machine-learning models to determine the properties of the product (e.g., detect and classify deviations from product specifications). The analytics system 120 may trigger or suggest one or more corrective actions based on the analysis performed, such as flagging products for visual inspection, suggesting configuration changes to other inspection systems, and/or changing the configuration of the productions system 110, etc. Various functionality provided by the analytics system 120 is described in greater detail below with respect to FIGS. 2-5. Note that in some embodiments, rather than having a separate analytics system 120, the corresponding functionality may be provided directly by the production system 110 (e.g., the machine learning models may be deployed on the cameras 112 or by a subsystem of the production system 110).

The network 170 provides the communication channels via which the other elements of the networked computing environment 100 communicate. The network 170 can include any combination of local area and wide area networks, using wired or wireless communication systems. In one embodiment, the network 170 uses standard communications technologies and protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, some or all of the communication links of the network 170 may be encrypted using any suitable technique or techniques.

Example Analytics System

Figure 2:
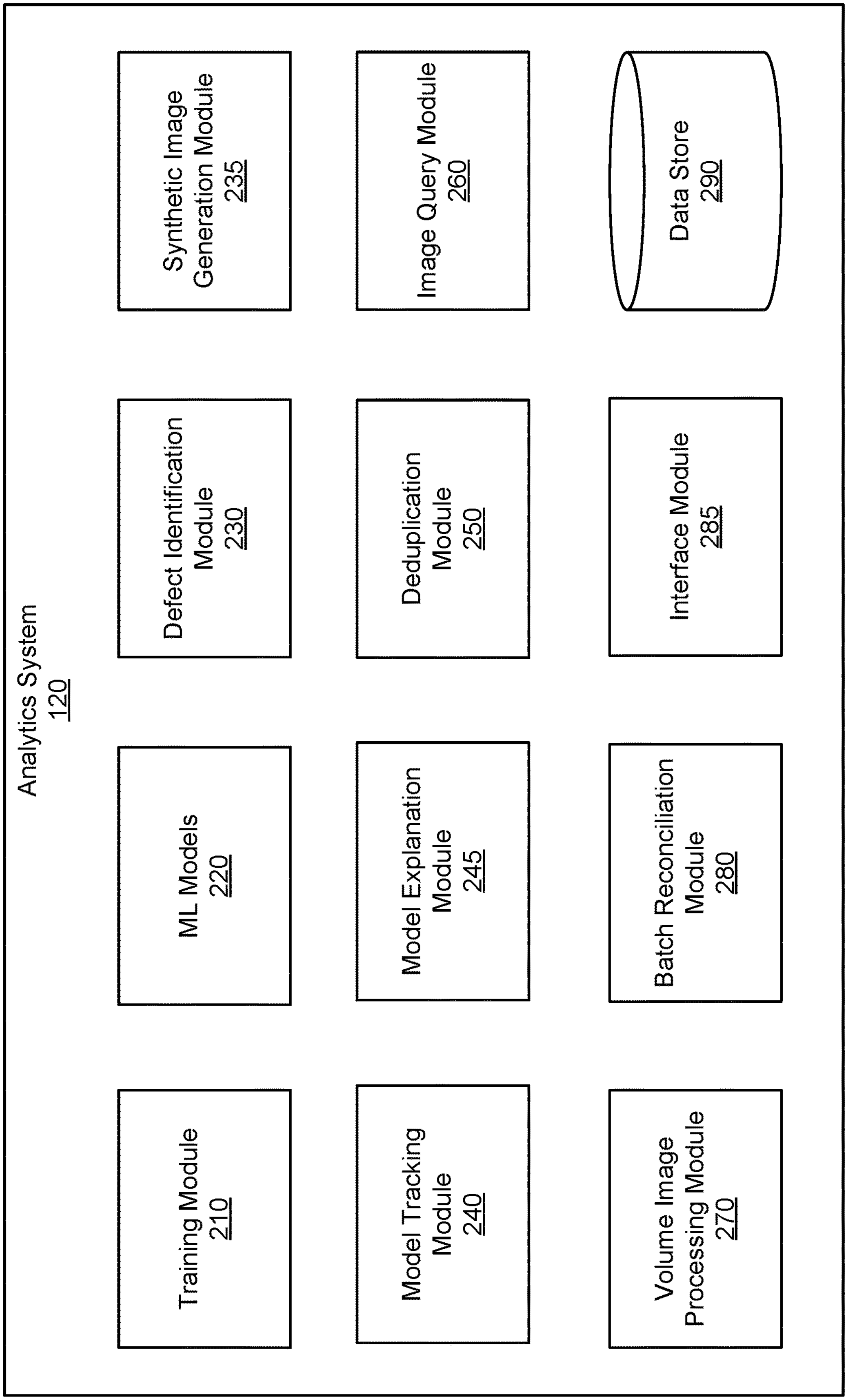
FIG. 2 illustrates an example architecture of an analytics system in accordance with one or more embodiments.

FIG. 2 illustrates an example architecture of an analytics system 120 in accordance with one or more embodiments. The analytics system 120 includes a training module 210, one or more machine learning models 220, a defect identification module 230, a synthetic image generation module 235, a model tracking module 240, a model explanation module 245, a deduplication module 250, an image query module 260, a volume image processing module 270, a batch reconciliation module 280, an interface module 285, and a data store 290. In alternative configurations, different and/or additional components may be included in the architecture of the analytics system 120.

Models for Particles, Fiber & Surface Defects

The training module 210 is configured to train, retrain, or fine-tune one or more machine-learning models 220. The one or more machine-learning models 220 are configured to receive images as input to determine whether a variety of defects are present. The defect identification module 230 applies the one or more machine-learning models 220 to images received from the cameras at the production system 110 to detect defects. In some embodiments, for each image captured by a camera, a machine-learning model is applied to the image to identify whether one or more types of defect are present. Responsive to detecting a defect of a particular type, the defect identification module 230 labels the image with the detected type of defect and stores the labeled image in a data store (e.g., data store 290).

Various types of defects may be identified, such as particle, fiber, and surface defects. Particle defects refer to unwanted, foreign particles present in the product. They can be anything from dust or pollen to fragments of packaging materials. In liquid pharmaceuticals, for example, particle defects might include undissolved substances or contaminates that should not be present. In solid products, particle defects could be extraneous materials mixed in with the product. Particle defects are concerning because they can affect the purity and efficacy of the medication and pose health risks to patients. Fiber defects refer to unwanted fiber present in the product. Such fibers can originate from various sources, such as packaging materials, processing equipment or manufacturing environment. Fiber contamination can be particularly problematic in sterile products, where they pose a risk of causing reactions or infections when administered to patients. Surface defects refer to imperfections on the surface of solid dosage forms, such as tablets capsules, or on the packaging components, including vials, ampoules, and syringe bodies, surface defects can include cracks, chips, scratches, or uneven coatings that might compromise the structural integrity of the product, alter its dissolution rates, or reduce its shelf life.

Different machine-learning technologies may be used to identify defects, including (but not limited to) convolutional neural networks (CNNs), autoencoders, transfer learning, decision trees and random forests, support vector machines (SVMs), recurrent neural networks (RNNs), long short-term memory (LSTM) networks, object detection modules, among others. CNNs are powerful for identifying visual patterns directly from pixel images with minimal preprocessing. Autoencoders are configured to learn to encode the "normal" state of a product and detect anomalies. When presented with new data, autoencoders can highlight anomalies or defects by comparing the input with its reconstruction, which is based on the learned normal state. Transfer learning can leverage pre-trained models (e.g., CNNs) on large datasets and fine-tuning them for specific defect detection tasks, especially when the available training data is limited. Decision trees and random forest can be used for less complex defect detection tasks, and have high interpretability. SVMs are effective for classification problems, e.g., classifying an image as having a defect or not having a defect. RNNs and LSTM networks are useful for detecting defects in sequential data, such as time-series data from sensors monitoring machinery or production processes. Object detection models include You Only Look Once (YOLO), single shot detector (SSD), and Faster R-CNN, which may be used to detect objects within images and can be adapted for defect detection by identifying unwanted items or features. The choice of a model may depend on the specific type of defect, the type of data available for training, and the computational resources available.

In some embodiments, both the training and inference phases leverage a parameterized and templated code framework, which not only ensures that models are developed under standardized conditions but also promotes code reusability across different projects. This approach supports rapid and efficient development cycles and facilitates the adaptation of models to new use cases with minimal adjustments.

Synthetic Image Generation

Training models to detect very small defects is challenging for several reasons because there is often a lack of sufficient sample datasets and detailed industry information to train these models effectively. In particular, not all defect types are equally represented. Classes of defects such as fibers and particles often have fewer examples in historical datasets. In case of new machines, only test defect set images exist. Additional image data that represents what defects look like in production is helpful in developing a robust machine-learning model.

The synthetic image generation module 235 addresses the above-described problems by augmenting limited real-world datasets and introducing controlled variability in generating synthetic images. In some embodiments, the synthetic image generation module 235 utilizes various generative models to generate synthetic images. In one such embodiment, the synthetic image generation module 235 uses generative adversarial networks (GANs) to generate synthetic images. GANs include two neural networks, the generator and the discriminator, which are trained simultaneously. The generator learns to create images that look real, while the discriminator learns to distinguish real images from the synthetic ones generated by the generator. Consequently. the generator becomes adept over time at producing highly realistic images.

In another such embodiment, the synthetic image generation module 235 uses variational autoencoders (VAEs) to generate synthetic images. VAEs are a type of autoencoder that generate new data points with the same statistical properties as the training set. They work by encoding an input into a latent space representation and then decoding it back, but they can also sample new points in the latent space to generate new data.

In yet another such embodiment, the synthetic image generation module 235 uses differential morphing (Diff Morph) to generate synthetic images. Diff Morph uses differential equations to transition or morph between images smoothly. This may be used to generate intermediate frames between two distinct images, creating a sequence of synthetic images that vary slightly from one to the next.

In a further such embodiment, the synthetic image generation module 235 uses diffusion models to generate synthetic images. Diffusion models are a class of generative models configured to add random noise to an image gradually and then learning to reverse this process to generate new images from noise. Diffusion models can transform and generate images based on learned distributions. The synthetic image generation module 235 may use Poisson blending models to generate synthetic images. Poisson blending models are configured to blend one part of an image into another image.

The effectiveness of deep learning models varies depending on the use case and the quantity of available images. For instance, VAEs and Diff Morph may be employed to synthesize examples of particle defects, whereas GANs might be used for generating synthetic instances of stopper defects in syringes. Similarly, Poisson Blending models may be used in producing extra examples of particle and surface defects. In some embodiments, the synthetic image generation module 235 is configured to identify images containing a particular type of defect for which there is insufficient training data available, and select a generative model based on the particular type of defect to generate additional synthetic images based on the identified images.

The synthetic image generation module 235 may also use other data augmentation techniques. Though not generating new images from scratch, data augmentation manipulates existing images through techniques such as flipping, rotation, scaling, cropping, or changing the color balance to create variations. This can also effectively increase the size and diversity of training datasets.

Model Tracking and Explanation

The process of detecting defects in products, particularly in varied containers such as vials and syringes, is significantly complicated by several factors. First, the physical characteristics of the containers themselves, which may differ in material, shape, and size, can affect how defects are identified. This complexity is further amplified by the variations in the viscosity of the liquids these containers hold. For example, thicker liquids may obscure certain types of defects that would otherwise be visible in thinner liquids, necessitating adjustments in the inspection process. Additionally, the inspection process is affected by disparities in backlighting and camera specifications. Differences in lighting can dramatically alter the visibility of defects, while variations in camera specifications, including resolution and frame rate, can influence the quality and consistency of the images captured for analysis. The diversity in the types and sizes of images obtained from these inspections introduces another layer of variability that machine learning models must navigate to accurately detect defects.

Despite these challenges, the models used in these inspections can be trained using the disclosed techniques to be highly accurate and reliable. This is especially valuable when inspecting pharmaceutical products, where maintaining false negatives below a threshold—instances where defects go undetected—may be required by regulators. Beyond these performance metrics, explainability is also valuable. It is advantageous for the models to demonstrate their decision-making processes and reliability transparently, particularly to regulatory bodies that oversee product safety and quality standards. This desire for explainability adds a significant layer of complexity to the development of these models, as it requires the incorporation of mechanisms that can articulate the rationale behind their predictions.

The model tracking module 240 and model explanation module 245 address these issues. The model tracking module 240 systematically documents various aspects of the model development process, including all parameters, references to training data, hyperparameters, and model artifacts. This comprehensive recording ensures that each step of the model's development is transparent and reproducible. In some embodiments, the model tracking module 240 captures model performance metrics and outcomes of each experiment run, providing valuable insights into the model's efficacy across different scenarios.

In some embodiments, the model tracking module 240 is further configured to perform automated hyperparameter tuning to adjust the machine-learning model's hyperparameters interactively, aiming to optimize its performance against a set of predefined metrics. The hyperparameter tuning may be tailored to a particular model's intended use case, such as identifying a specific type of defects, ensuring that the final model is not only effective and explainable but also finely tuned to the nuances of the task at hand.

The model explanation module 245 further enhances the explainability of machine learning model 220 through the integration of pre-processing and post-processing stages within the model training pipeline. During the pre-processing stage, images undergo specific transformations to prepare them for analysis by the model. These transformations might include normalization, resizing, or augmenting the images to ensure consistency and improve the model's ability to detect defects. The post-processing stage then takes the model's output and applies additional transformations or annotations to make the results more understandable to humans. For instance, bounding boxes can be drawn around regions of images where defects are detected, visually highlighting the affected areas for end users. Thus, the model explanation module 245 can provide spatial context within the image for identified defects, making it easier for users to locate and assess the defects.

In some embodiments, the model explanation module 245 further employs a gradient-weighted Class Activation Mapping (Grad-CAM) based approach. Grad-CAM uses the gradients of any target concept (such as a defect type) flowing into the final convolutional layer of a model to produce a coarse localization map, highlighting the important regions in the image for predicting the concept. By overlaying these heatmaps on the post-processed images, users can visually understand which areas of the image contributed most significantly to the model's classification decision, providing insights into the model's "thought process."

In some embodiments, the post-processed images are enriched with heatmaps that vary in intensity based on the model's confidence in the defect classification. These heatmaps offer a straightforward, intuitive way for users to gauge the model's certainty about the presence and severity of defects, facilitating quicker and more informed decision-making.

In some embodiments, all generated information, including annotated and heatmap-enhanced images, can be made accessible to end users through user-friendly consumption applications. Ensuring the reliability and reproducibility of these insights, the entire training and deployment lifecycle of the models can be conducted within immutable environments. Such environments prevent alterations to the model's configuration post-deployment, thereby improving the model's consistency over time.

In some embodiments, to aid in model development and maintenance, the model explanation module 245 automatically generates TensorBoard logs, providing users with a detailed view of the model's training progress and performance metrics. In some embodiments, on-demand profiling may also be available, offering a tool for debugging models during training phases or conducting detailed performance analysis post-deployment. Together, the experiment tracking module 240 and model explanation module 245 form a comprehensive ecosystem that supports the creation, deployment, and operational monitoring of explainable, reliable machine-learning models.

Context-Aware Deduplication

As described above, in some embodiments, the production system 110 may use multiple cameras positioned at various angles around the product being inspected. This may result in a same defect being detected and captured in multiple images from different viewpoints. To accurately identify unique defects and prevent the same defect from being counted multiple times, a deduplication module 250 can be implemented. In some embodiments, the deduplication module 250 operates independently of the machine learning process and utilizes the captured images to address the issue of double counting defects.

In some embodiments, the deduplication module 250 identifies unique and/or duplicate sets of defects. The identification may be based on foundational context of camera groups designated for specific defect detection and the defect label context provided by the defect identification module 230. The foundational context of camera groups includes (but is not limited to) how cameras are positioned relative to the product, and coordination between cameras to function simultaneously or sequentially.

The deduplication module 250 may also leverage metadata such as exchangeable image file format (EXIF) metadata, operational metadata, and/or camera/line speed data, among other information in identifying unique and/or duplicate sets of defects. EXIF metadata specifies the formats for images and auxiliary tags used by digital cameras and other systems. When an image is taken with a camera that supports EXIF, information about the camera settings, the shooting conditions, and sometimes location data are stored within the image file. This can include details such as the camera model, the date and time the photo was taken, exposure settings, focal length, and potentially GPS data indicating where the image was captured. Operational metadata includes information that describes how and when an image or batch of images was captured, processed, or analyzed. This can include the operational status of the camera at the time of capture, such as the version of the software running on the camera, timestamp data for when an image was processed or analyzed, and parameters or settings used during image processing. Camera or line speed data includes the operational speed at which cameras capture images or the speed at which products move through a production or inspection line. In manufacturing and inspection processes, cameras may need to capture images at high speeds to keep up with the pace of the production line. Camera speed data can include the frame rate at which a camera is capturing images, while line speed data may refer to the rate at which products are moving past a fixed camera setup.

Upon identifying a set of duplicate defects, the deduplication module 250 groups them together. In some embodiments, the deduplication module 250 selects one image from the group to represent a unique defect and associates the remaining images of the same defect with this chosen image. The deduplication module 250 may select an image that has a highest confidence score for the detected defect to represent the unique defect.

In some embodiments, a subject matter expert on deduplication (SMEDupli) may also be able to input their findings to the deduplication module 250. In some embodiments, the deduplication module 250 presents defects that are identified by the machine learning models as duplicates to a user (e.g., a SMEDupli), and the user may be able to accept or reject the detected duplicate defects, or manually group duplicate defects together. Additionally or alternatively, the deduplication module 250 may present images with defects determined to be unique by the machine learning models to the user in conjunction with potentially related images e.g., other images captured at similar times that should include the same product) for the user to confirm that the defect is in fact uniquely displayed in the initial image.

Image Query and Exploration

Traditionally, managing and analyzing vast quantities of image data generated by various inspection machines presented a formidable challenge. The tasks of locating images associated with specific types of defects, categorizing and auditing these images for different manifestations of defects, using the images in investigations to understand increased rejection rates, or verifying adherence to quality standards were complex and time-consuming. This complexity was compounded by the difficulty in optimizing and calibrating inspection machines to improve their accuracy and efficiency, as relevant data was hard to isolate. Furthermore, the decision-making process regarding the acceptance or rejection of products based on these inspections often lacked transparency, leaving the rationale buried within the complex operations of the machines.

The image query module 260 provides a solution to these challenges. The image query module 260 simplifies the process of image data management and analysis by offering users features for exploring vast image databases, including filtering, sorting, and classification capabilities. These functionalities are supported by artificial intelligence/machine learning models and/or insights from subject matter experts.

In some embodiments, the image query module 260 uses cloud services and microservices architecture to enable users to conduct searches for images. Searches can be based on a wide range of criteria, including location, building, production line, specific machines, product types, batches, and time frames. This flexibility allows for pinpoint identification of images across even vast historical datasets, enabling users to refine their search further to include specific machines, camera setups, and defect types as identified by machine learning models 220 or expert analysis. In some embodiments, the image query module 260 can offer sub-second response times that streamline the auditing, classifying, and labeling processes according to predefined defect categories.

In some embodiments, the image query module 260 is built on a scalable, serverless framework, ensuring that requests can be processed swiftly. This efficiency can be maintained regardless of the volume of user demand or the number of end users. The image query module 260 may support asynchronous operations for initiating download requests, allowing users to continue their work without interruption while waiting for data. The image query module 260 may provide notifications when the data is ready, alongside estimates for download times tailored to the user's network speed.

Furthermore, traditionally, the process of analyzing inspection images, whether for routine performance evaluation, conducting root cause analysis, or aiding in investigative efforts, has been overwhelmingly manual. This manual approach has not only been inefficient but also lacked a mechanism for pausing and sharing ongoing analysis with team members or quality assurance groups. Such limitations have frequently resulted in decreased productivity and unnecessary delays in investigative processes, as analysts had no means to effectively manage or collaborate on their analytical work.

Addressing this challenge, the image query module 260 introduces the ability for users to save their current state of analysis. For instance, when examining particle defects across different batches, an analyst faced with the daunting task of scrutinizing up to 500 particle defects can now pause their analysis at any point. This may be achieved by creating a "state bookmark," which effectively saves the current state of their work. This feature enables users to halt their analysis without losing progress and resume it at a more convenient time, significantly enhancing flexibility and efficiency.

In some embodiments, the image query module 260 facilitates collaborative efforts by allowing users to share these analysis state bookmarks with colleagues. Such sharing is advantageous for verifying findings, assigning labels to specific images, or selecting images for use in future machine-tuning. This collaborative feature not only streamlines the verification process but also enriches the analysis by incorporating diverse perspectives and expertise, leading to more accurate and comprehensive outcomes.

In some embodiments, the bookmark handling feature is configured as a modular component, distinct from the core application. Implemented as a microservice, it offers the flexibility to be adapted or extended to support state saving and resumption across a variety of applications. This modular approach not only enhances the system's versatility but also allows for the seamless integration and scalability of this feature, catering to the evolving needs of users and organizations.

By introducing the capability to pause, resume, and collaboratively engage in image analysis, the image query module 260 revolutionizes traditional inspection image analysis workflows. It addresses previous inefficiencies and collaboration barriers, significantly improving productivity, accelerating investigative processes, and ultimately contributing to more effective and timely decision-making in quality control and maintenance procedures.

Volume Image Processing

Optimizing the accuracy of vision inspection machines for inline defect detection traditionally requires a curated set of images representing specific defect classes. However, the sheer volume of data generated by these machines, often reaching terabytes, poses a significant challenge. Manually identifying an appropriate image set for tuning purposes has been virtually impossible, complicating the optimization process. Additionally, selecting and transferring gigabytes (GBs) of image data per defect for optimization has been a logistical hurdle. In web-based solutions, downloading large volumes of data has been particularly problematic. Downloads are typically managed by client browsers, where any interruption necessitates restarting the entire download process, an impractical solution given the scale of data involved.

The volume image processing module 270 addresses these challenges. In some embodiments, the volume image processing module 270 is on a microservices architecture, which separates the volume download requests from the download process itself. Upon receiving a download request, the volume image processing module 270 analyzes the payload to determine the volume of images needed, organizes these images into manageable sub-parts based on file size, and dynamically scales resources by launching multiple worker nodes. These nodes are tasked with retrieving and compressing the images, extracting selected metadata, and transferring the data to a designated staging area for each sub-part, facilitating streamlined downloads.

Post-processing, the orchestration of the download process is managed by an orchestrator that consolidates the locations of the image metadata and the download sub-parts, making them accessible to the user through the application interface. Moreover, the volume image processing module 270 maintains a log of which sub-parts have been successfully downloaded, enhancing reliability and user experience.

Implemented with the image query module 260, this volume image processing module 270 not only provides users with an asynchronous method for initiating download requests but also informs them when the data is ready for download. This allows users to continue with their analytical work uninterrupted. The volume image processing module 270 also offers adaptive feedback on download times based on the user's network connectivity, further personalizing the experience.

Leveraging a serverless framework, this approach is not only scalable and swift, drastically reducing processing times from hours to minutes, but it also generalizes to any large-scale file download process. This innovative solution significantly eases the logistical challenges associated with selecting and transferring large volumes of image data for the optimization of vision inspection machines, streamlining the process and making it more efficient.

Batch Reconciliation

During manufacturing, operational pauses and restarts are a routine part of the workflow, especially prevalent during stages such as filling, inspecting, and packaging. These halts, whether brief or extended, arise due to a variety of operational needs, including line clearance, routine maintenance, or complications with raw materials. Such disruptions may introduce significant data inconsistencies, as each pause and subsequent restart can alter the flow of production in numerous ways. Batches may be reset, continued under a different guise, or re-inspected with new identifiers, often adhering to a set of protocols that vary across the production spectrum. This variability can manifest multiple times within a single batch, compounding the challenge by introducing layers of data discrepancies.

The batch reconciliation module 280 counters the challenges posed by these operational interruptions by monitoring and managing batch splits in a dynamic, real-time environment. The batch reconciliation module 280 maintains an up-to-date record of main batches alongside any resultant sub-batches, ensuring integration of data across the board. Utilizing a set of customizable rules, the batch reconciliation module 280 determines the actual start and end times of production processes, facilitating the execution of computations and the generation of detailed reports upon the completion of each batch.

The batch reconciliation module 280 is able to adapt and evolve with the production environment. Whenever a new sub-batch emerges, it is systematically reconciled against the main batch record, ensuring continuity and integrity of data. This process is inherently scalable, designed to accommodate the addition of new production lines or the modification of existing protocols with minimal if any additional programming. The incorporation of new lines, or the adjustment to batch handling procedures, can be achieved through straightforward updates to the module's rule set, eliminating the need for extensive software revisions.

This batch reconciliation module 280 thus bridges the data discontinuity gap. It offers a robust, flexible framework capable of handling a wide array of process data and varying batch contexts. Streamlining the reconciliation process not only enhances operational efficiency but also significantly reduces the potential for errors associated with data fragmentation. In doing so, it ensures a more coherent and reliable manufacturing process, reinforcing the foundation for quality assurance and operational excellence.

Example Graphical User Interface

The interface module 285 is configured to present inspection or batch reconciliation results at client devices of users, or allow users to input search queries for the image query module 260 or volume image processing module 270.

Figure 3:
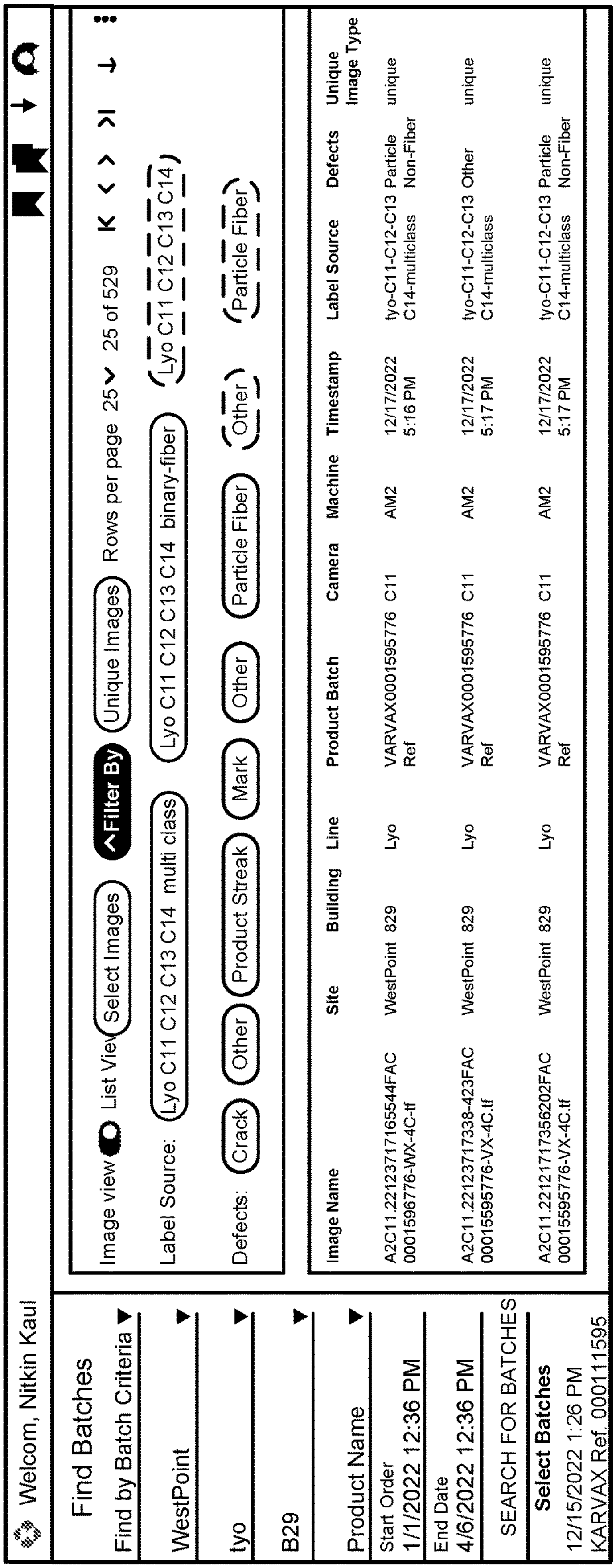

FIGS. 3-5 are examples of graphical user interfaces (GUIs) of the analytics system 120 in accordance with one or more embodiments. These GUIs allow users to manage and analyze batches of products, with the ability to track, search, and classify product defects through captured images. Users can also select specific images, which could be used for further analysis, reporting, or machine learning applications as model training or quality assurance checks.

Referring to FIG. 3, GUI 300 includes a navigation bar with tabs for different functionalities at the top. The functionalities include "Find Batches," currently selected. On the left side of the GUI 300, there is a panel titled "Find Batches" with fields to input or select criteria such as "File Name," "Line Name," "building Name," and "Product Name." There are also options for specifying the start and end date and a button labeled "search for batches." The main panel of the GUI 300 shows an "image view" with options for "list view" and "select images," and a "filter by" feature that allows users to filter images based on specific criteria. Labels for potential defects are also present, including "crack," "other," "product splashing/splatter," "weed/mark," "other particle-fiber," "other particle-non-fiber," with check-boxes next to each category.

Below the filters, there's a table with columns for "Image Name," "Site," "Building," "Line," "Product," "Batch," "Camera," "Machine," "Timestamp," "Label Source," "Defects," and "Unique Image Type." The table lists several entries, each corresponding to an image captured during the manufacturing process, along with associated data such as the site, specific building, line number, and product details. Each row also indicates the timestamp of when the image was captured, the source of the labeling, the type of defect detected, and whether the image is unique.

The "Label Source" column references specific codes, perhaps linked to a classification system or a database of defects. The "Defects" column categorizes the type of defect identified in the images. Finally, there's a mention of "Unique Image Type," which refers to whether an image shows a unique defect or is a duplicate of another image in terms of the defect shown.

FIG. 4 illustrates a GUI 400 in a table format. The GUI 400 shows a record table of status of a batch. There are several columns in the table, including "S.No," "Row," "rule," "batch ID," "start time," "end time," totally inspected," "totally accepted," "totally rejected," and "comments." "S. No" stands for serial number, marking the sequence of records. "Row" contains numerical values that could possibly indicate a sorting or grouping mechanism. "RULE" describes the operation applied, with entries like "split_batch," "split_batch_single_record," and mentions of different stages. "Batch ID" indicates unique identifiers for batches being processed. "Start Time" and "End Time" columns indicate timestamps indicating when the batch processing began and ended. "Total Inspected" indicates the number of items inspected in each batch. "Total Accepted" indicates the number of items that passed inspection. "Total Rejected" indicates the number of items that failed inspection. The "Comments" column includes notes related to the batch, with the last entry stating "Ignore this batch." Rows 5 to 7 also include "Stage 1," "Stage 2," and "Stage 3" in the "RULE" column, followed by "Row" indications, which references specific steps or checkpoints in the batch process. The table shows varying numbers of inspected, accepted, and rejected items, which could be used to track performance, yield, and quality over time. The entry under "Comments" for row 3 suggests an exception or an anomaly in the records, as it instructs to "Ignore this batch," implying that the entry may be an error or an outlier in the dataset.

FIG. 5 illustrates a GUI 500 in a table format. There are several columns in the table, including "batch_key", "v1_actual_end_time," "v1_actual_start_time," "batch_id", "batch_type", "building", "v1_end_total_accepted", "v1_end_total_inspected", "v1_end_total_rejected." batch_key corresponds to a unique identifier for each batch which includes a combination of numbers, letters, and a location or site code (e.g., "WestPoint_lqp_R29_AM"). v1_actual_end_time corresponds to timestamps indicating when the batch processing ended. The format includes both date and time. v1_actual_start_time corresponds to timestamps showing when the batch processing started, also including both date and time. batch_id corresponds to another identifier for the batch, which is numeric and related to the batch_key. batch_type corresponds to a type of batch, with entries such as "child_batch" and "parent_batch," which refers to relationships in the processing hierarchy. building specifies the building, in this case, all are listed as "829." v1_end_total_accepted corresponds to a number of items or units accepted by the end of the batch process. v1_end_total_inspected corresponds to a number of items or units inspected during the batch process. v1_end_total_rejected corresponds to a number of items or units rejected by the end of the batch process.

Example Methods for Automated Product Inspection

Figure 6:
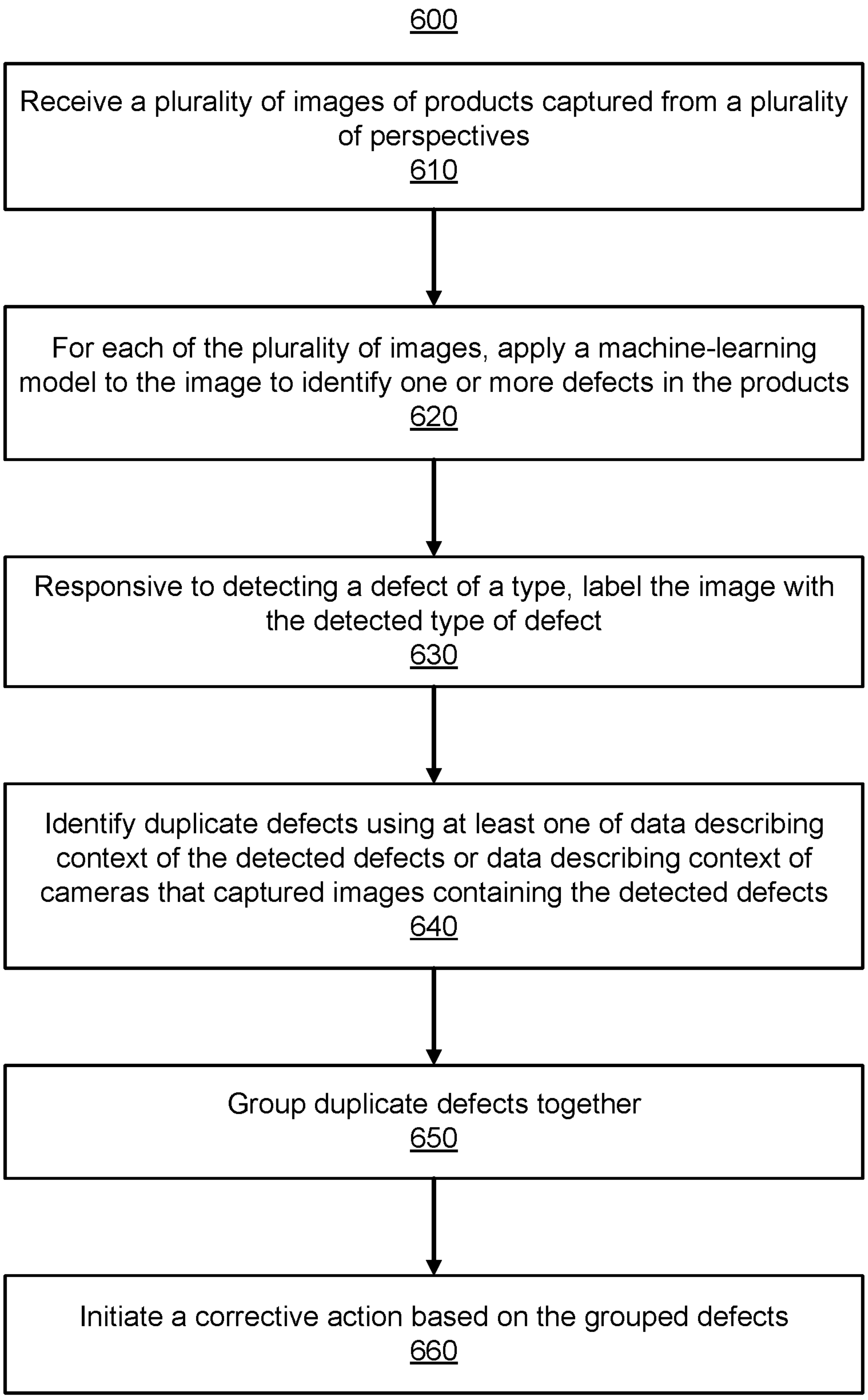
FIG. 6 is a flowchart of a method for automated product inspection in accordance with one or more embodiments.

FIG. 6 is a flowchart of a method 600 for automated product inspection in accordance with one or more embodiments. In various embodiments, the method includes different or additional steps than those described in conjunction with FIG. 6. Further, in some embodiments, the steps of the method may be performed in different orders than the order described in conjunction with FIG. 6. The method described in conjunction with FIG. 6 may be carried out by the analytic system 120, the product system 110, or a combination thereof.

The analytic system 120 receives 610 a plurality of images of products captured from a plurality of perspectives. These images may be captured by multiple cameras 112 at one or more production systems 110. In some embodiments, each production system 110 includes multiple cameras positioned at different angles around a product being inspected. For example, a set of four cameras might be placed on each side of a product to identify particle defects.

The analytic system 120 applies 620 a machine-learning model to each image to identify one or more defects in the products. In some embodiments, multiple machine-learning models are applied to each image to identify a particular type of defect, such as (but not limited to) particle, fiber, or surface defects. Particle defects and fiber defects refer to unwanted, foreign particles or fiber present in the product. These defects can be particularly problematic in sterile products, where they pose a risk of causing reactions or infections when administered to patients. Surface defects refer to imperfections on the surface of solid dosage forms, such as tablets and capsules. Surface defects might compromise the structural integrity of the product, alter its dissolution rates, or reduce its shelf life.

Responsive to detecting a defect of a particular type, the analytic system 120 labels 630 the image with the detected type of defect. In some embodiments, the analytics system stores the labeled image in a data store. In some embodiments, the labeled images may further be used as training dataset to retrain the machine-learning model. In some embodiments, the analytic system 120 is further configured to identify an area in an image that corresponds to a detected defects, and annotates the image by generating a bounding box around the identified area. In some embodiments, the analytic system 120 is further configured to identify a heatmap that indicates the machine-learning model's confidence in identifying defects, and overlays the heatmap onto the image.

The analytic system 120 identifies 640 duplicate defects based in part on data associated with context of the detected defects and data associated with context of cameras that captured images containing the detected defects. As described above, the images are taken by multiple images positioned at different angles around the product being inspected. This may result in a same defect being detected and captured in multiple images from different view points.

The context of the detected defects may include a type of defect identified for each image. The context of cameras may include (but is not limited to) how the cameras are positioned relative to the product, coordination between cameras, EXIF metadata, operational metadata, and/or camera/line speed data.

The analytics system 120 groups 650 duplicate defects together. In some embodiments, the deduplication module 250 selects one image from the group to represent a unique defect and associates the remaining images of the same defect with this chosen image. In some embodiments, the deduplication module 250 selects an image that has a highest confidence score for the detected defect to represent the unique defect.

The analytics system 120 initiates 660 a corrective action based on the grouped defects. The corrective action may include creating a report to record the defect and a batch the defect was found in, issuing a notification to alert a user (e.g., a human inspector), isolating or quarantining the affected batch to prevent it from being distributed or used further, and conducting an investigation. This investigation may include additional analysis of images taken of the batch before the detection of the defect to determine its cause or pinpoint where the defect may have originated, among other actions.

In some embodiments, the analytics system 120 presents unique or duplicate defects identified in one or more images on a client device. In some embodiments, a subject matter expert on deduplication (SMEDupli) may also be able to input their findings to the deduplication module 250. In some embodiments, the deduplication module 250 presents unique or duplicate defects to a user (e.g., a SMEDupli), and the user may be able to accept or reject the detected duplicate defects, or manually group duplicate defects together.

Computing System Architecture

Figure 7:
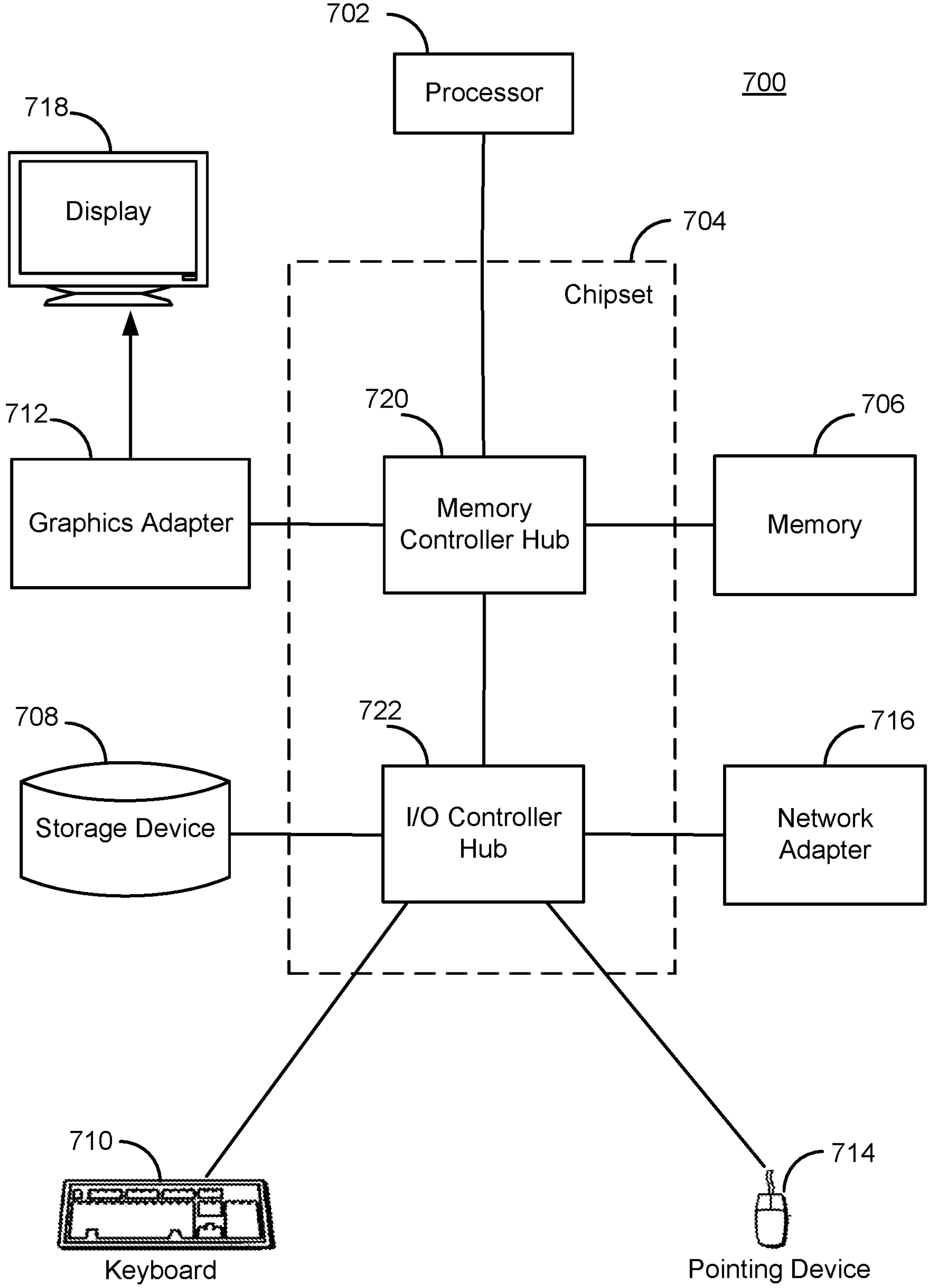
FIG. 7 is a block diagram illustrating an example of a computer suitable for use in the production environment of FIG. 1, according to one embodiment.

FIG. 7 is a block diagram of an example computer system 700 suitable for use in the analytics system 120 or as a controller within the production system 110. The example computer system 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer system 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touch-screen, or other type of pointing device, and may be used in combination with the keyboard 710 (which may be an on-screen keyboard) to input data into the computer system 700. The graphics adapter 712 displays images and other information on the display 718. The network adapter 716 couples the computer system 700 to one or more computer networks, such as network 170.

The types of computers used by the entities of FIG. 1 can vary depending upon the embodiment and the processing power required by the entity. For example, the analytics platform might include multiple blade servers working together to provide the functionality described. Furthermore, the computers can lack some of the components described above, such as keyboards 710, graphics adapters 712, and displays 718.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing the described functionality. Thus, while particular embodiments and applications have been illustrated and described, it is to be understood that the described subject matter is not limited to the precise construction and components disclosed. The scope of protection should be limited only by any claims that are ultimately issued.

What is claimed is:

1. A method comprising:

receiving a plurality of images of products captured from a plurality of perspectives;

for each of the plurality of images, applying a machine-learning model to the image to identify whether one or more defects are present in the products;

responsive to detecting a defect of a type, labeling the image with the detected type of defect;

identifying duplicate defects using at least one of data describing context of the detected defects or data describing context of cameras that captured images containing the detected defects;

grouping duplicate defects together;

initiating a corrective action based on the grouped defects;

generating tracking data describing one or more of parameters, training data references, hyperparameters, or model artifacts during training of the machine-learning model; and providing the tracking data for display at a client device to provide explainability of output of the machine-learning model.

2. The method of claim 1, further comprising:

identifying an area in an image that corresponds to a detected defect;

annotating the image by generating a bounding box around the identified area; and providing the annotated image for display at a client device.

3. The method of claim 1, further comprising:

generating a heatmap that indicates confidence of the machine-learning model in identifying defects;

overlaying the heatmap onto the image; and providing the image overlayed with the heatmap for display on a client device.

4. The method of claim 1, further comprising retraining the machine-learning model based on the labeled images.

5. The method of claim 1, wherein training of the machine-learning model comprises:

generating one or more synthetic images based on one or more original images identified as containing a particular type of defect; and training the machine-learning model based on the one or more original images and the generated one or more synthetic images.

6. The method of claim 5, wherein the generating one or more synthetic images comprises applying a generative model on the one or more original images to generate the one or more synthetic images that contain the particular type of defect.

7. The method of claim 6, wherein the generating one or more synthetic images further comprises:

selecting a generative model among a plurality of generative models based on the particular type of defect; and applying the selected generative model to the one or more original images to generate the one or more synthetic images.

8. The method of claim 1, wherein the corrective action comprises providing images containing unique or duplicate defects for display at a client device.

9. A non-transitory computer readable storage medium comprising stored instructions that, when executed by a computing system, cause the computing system to:

receive a plurality of images of products captured from a plurality of perspectives;

for each of the plurality of images, apply a machine-learning model to the image to identify whether one or more defects are present in the products;

responsive to detecting a defect of a type, label the image with the detected type of defect;

identify duplicate defects using at least one of data describing context of the detected defects or data describing context of cameras that captured images containing the detected defects;

group duplicate defects together;

initiate a corrective action based on the grouped defects;

generate tracking data describing one or more of parameters, training data references, hyperparameters, or model artifacts during training of the machine-learning model; and provide the tracking data for display at a client device to provide explainability of output of the machine-learning model.

10. The non-transitory computer readable storage medium of claim 9, wherein the instructions further cause the computing system to:

identify an area in an image that corresponds to a detected defect;

annotate the image by generating a bounding box around the identified area; and provide the annotated image for display at a client device.

11. The non-transitory computer readable storage medium of claim 9, wherein the instructions further cause the computing system to:

generate a heatmap that indicates confidence of the machine-learning model in identifying defects;

overlay the heatmap onto the image; and provide the image overlayed with the heatmap for display on a client device.

12. The non-transitory computer readable storage medium of claim 9, wherein the instructions further cause the computing system to retrain the machine-learning model based on the labeled images.

13. The non-transitory computer readable storage medium of claim 9, wherein the instructions further cause the computing system to:

generate one or more synthetic images based on one or more original images identified as containing a particular type of defect; and train the machine-learning model based on the one or more original images and the generated one or more synthetic images.

14. The non-transitory computer readable storage medium of claim 13, wherein the generating one or more synthetic images comprises applying a generative model on the one or more original images to generate the one or more synthetic images that contain the particular type of defect.

15. The non-transitory computer readable storage medium of claim 14, wherein the generating one or more synthetic images further comprises:

selecting a generative model among a plurality of generative models based on the particular type of defect; and applying the selected generative model to the one or more original images to generate the one or more synthetic images.

16. The non-transitory computer readable storage medium of claim 9, the corrective action comprises providing images containing unique or duplicate defects for display at a client device.

17. A computing system, comprising:

one or more processors; and a non-transitory computer readable storage medium having instructions encoded thereon that, when executed by the one or more processors, cause the computing system to:

receive a plurality of images of products captured from a plurality of perspectives;

for each of the plurality of images, apply a machine-learning model to the image to identify whether one or more defects are present in the products;

responsive to detecting a defect of a type, label the image with the detected type of defect;

identify duplicate defects using at least one of data describing context of the detected defects or data describing context of cameras that captured images containing the detected defects;

group duplicate defects together;

initiate a corrective action based on the grouped defects;

generate a heatmap that indicates confidence of the machine-learning model in identifying defects;

overlay the heatmap onto the image; and provide the image overlayed with the heatmap for display on a client device.

18. The computing system of claim 17, wherein the instructions further cause computing system to:

identify an area in an image that corresponds to a detected defect;

annotate the image by generating a bounding box around the identified area; and provide the annotated image for display at a client device.

19. The computing system of claim 17, wherein the instructions further cause computing system to:

generate one or more synthetic images based on one or more original images identified as containing a particular type of defect; and train the machine-learning model based on the one or more original images and the generated one or more synthetic images.

20. The computing system of claim 17, wherein the instructions further cause computing system to:

generate tracking data describing one or more of parameters, training data references, hyperparameters, or model artifacts during training of the machine-learning model; and provide the tracking data for display at a client device to provide explainability of output of the machine-learning model.

* * * * *